United States Patent [19]

Oosterberg

[11] 4,031,352

[45] June 21, 1977

[54] ELECTRIC BLANKET

[75] Inventor: Cedric Siegfried Oosterberg, Cape Town, South Africa

[73] Assignee: C. S. Oosterberg (Proprietary) Limited, Cape Town, South Africa

[22] Filed: Oct. 16, 1975

[21] Appl. No.: 623,105

[30] Foreign Application Priority Data

Oct. 18, 1974 South Africa .................. 74/6635

[52] U.S. Cl. .............................. 219/212; 219/505
[51] Int. Cl.² ........................................ H05B 1/00
[58] Field of Search .......... 219/212, 529, 549, 545, 219/505, 504, 501; 307/310

[56] References Cited
UNITED STATES PATENTS

| | | | |
|---|---|---|---|
| 3,437,792 | 4/1969 | Lauck | 219/212 X |
| 3,549,865 | 12/1970 | Frank et al. | 219/505 |
| 3,678,247 | 7/1972 | Sawa et al. | 219/501 |
| 3,946,200 | 3/1976 | Juodikis | 219/501 X |

Primary Examiner—C. L. Albritton
Attorney, Agent, or Firm—Robert H. Jacob

[57] ABSTRACT

An electric blanket assembly having a blanket whose heating elements are supplied from a low voltage supply source and a control circuit assembly adapted both to regulate the heating of the blanket and to disconnect the supply source from the heating elements under conditions of malfunction of the assembly. The control circuit includes temperature sensitive elements suitably located in the blanket and associated circuitry arranged to generate a control voltage which is selectable and reference voltage generating means which is also selectable. The control circuit also includes means to compare the control voltage and the reference voltage and to control current flow through the heating elements.

14 Claims, 4 Drawing Figures

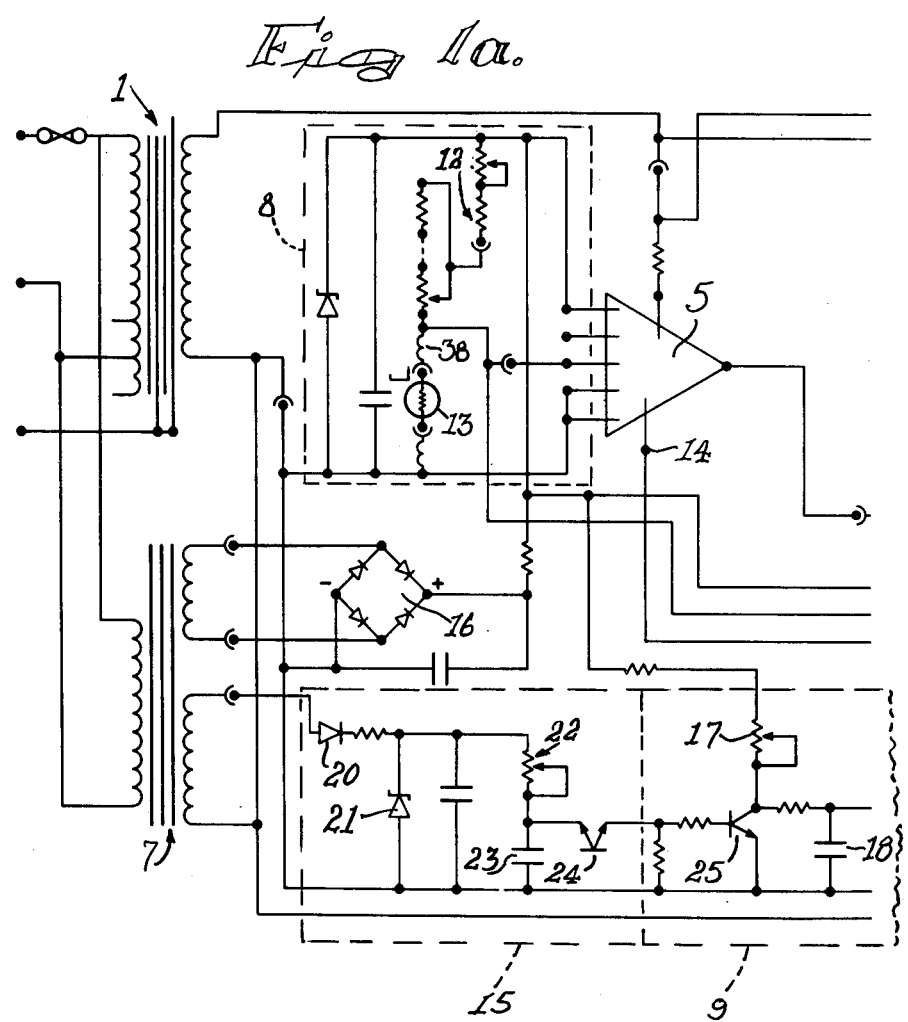

ELECTRIC BLANKET

This invention relates to electric blankets and a method of controlling the temperature of such blankets.

One problem encountered in the medical application of electric blankets is the regulation and control of the temperature of such blankets as well as providing for short circuits, over-temperatures and other potentially dangerous faults. Fail safe operation is of particular importance in medical application of such blankets.

Accordingly it is an object of the present invention to provide an electric blanket assembly which the applicant believes will have certain advantages.

According to the invention an electric blanket assembly includes a blanket having elements adapted to be heated from an electricity supply source and a control circuit assembly adapted to control current through the elements to regulate the heating of the blanket and further adapted to disconnect the supply source from the heating elements under conditions of malfunction of the blanket characterised in that the control circuit assembly includes temperature sensitive elements suitably located in the blanket and arranged to generate a control voltage, timing means adapted to generate a reference voltage and regulating means to compare the control voltage and the reference voltage and to trigger a solid state switching device which is adapted to control the current through the blanket heating elements.

Further according to the invention the regulating means includes differential amplifier circuitry, zero crossing detector amplifier circuitry and an output pulse circuit. With this arrangement the control voltage is applied to one input of the differential amplifier and the reference voltage to the other. Preferably the connection is such that as long as the control voltage is higher than the reference voltage then the regulating means feeds output pulses to trigger the solid state switching device. When the control voltage is lower than the reference voltage no pulses are fed to the switching device and no current flows through the heating elements. Preferably the solid state switching device is a triac.

The reference voltage is preferably of a ramp like nature and is arranged to be cyclic with a preset time period. In this way it will be possible to control the 'on' time of the triac accurately.

The temperature sensitve elements are preferably negative temperature coefficient thermistors and are arranged in resistance bridge form with a potentiometer to generate the control voltage which is applied to the one input of the differential amplifier.

Also according to the invention the control circuit assembly includes safety means adapted to disconnect the supply source from the blanket heating elements under conditions of malfunction of the blanket assembly. Preferably this safety means is connected to the control voltage generated by the thermistors and is adapted to operate a relay or the like to disconnect the supply from the heating elements. Preferably too the safety means includes differential amplifier circuitry, zero crossing detector amplifier circuitry and an output pulse circuit. With this arrangement the control voltage is applied to one input of the differential amplifier and a pre-selected reference voltage to the other input of the differential amplifier. The safety means is thus connected to operate similarly to the regulating means in that while the control voltage is higher than the pre-selected reference voltage output pulses are fed to a triac connected in series with the coil of a relay, the contacts of which are in series with the heating elements. Thus too as soon as the control voltage falls below the pre-selected reference voltage for any reason whatsoever the safety means will switch off the triac, the current through the relay will cease and the supply will be disconnected from the heating elements.

Still further according to the invention the control circuit assembly includes an alarm circuit adapted to operate in conjunction with the safety means. The alarm may be of a visible type but in a preferred form of the invention the alarm means is both visible and audible. Where an audible alarm is employed the control circuit preferably includes delay circuitry to delay the triggering of the audible alarm to avoid such triggering due to transients induced from external sources into the circuitry. With this arrangement therefore the audible alarm will only be triggered if the malfunction continues for a time period greater than the delay.

Further features of the invention are described with reference to the following description of a preferred embodiment of the invention which is given by way of an example. The description is with reference to the drawings in which:

FIG. 1 *a* and *b* comprise a circuit diagram of a control circuit assembly;

Figure 1B:
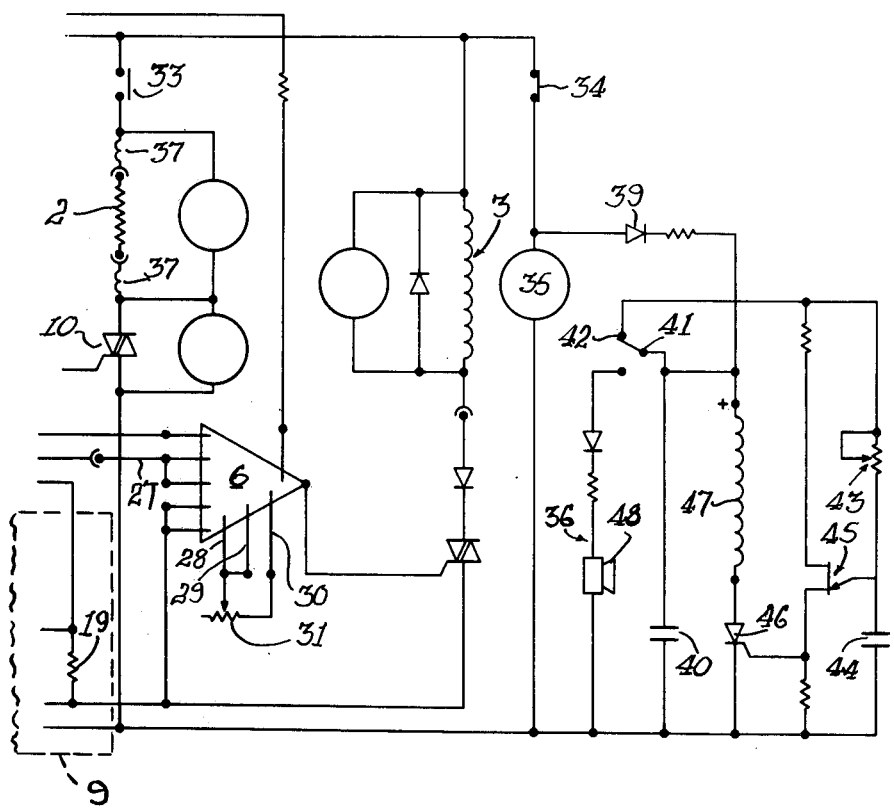

Referring to the drawings the control circuit assembly includes an electrostatically shielded 24 volt transformer 1 which supplies current to the blanket heating elements 2, the relay coil 3, the alarm circuit 4 and to the integrated circuits 5 and 6. A separate transformer 7 provides a power supply for the control voltage circuitry indicated generally by numeral 8 and also a supply for the reference voltage generating circuitry indicated generally by 9.

The current through the blanket heating elements is controlled by means of a triac 10 which is adapted to be triggered by means of output pulses from integrated circuit 5. A control voltage is applied to input pin 11 via a resistance bridge formed by the 11 position selector switch 12 and the thermistors 13. A reference voltage is applied to input pin 14 via the timing circuit 15 and the reference voltage generating circuitry 9. While the control voltage is higher than the reference voltage the integrated circuit 5 feeds pulses to the triac 10 each time the supply voltage from transformer 1 passes through the zero point. In this way the triac 10 is kept fully on and it allows current to pass through the heating elements 2. When the control voltage is equal to or less than the reference voltage no pulses are fed from the integrated circuit 5 to the triac 10 and it remains off thus interrupting the power supply to the heating elements.

Figure 3:
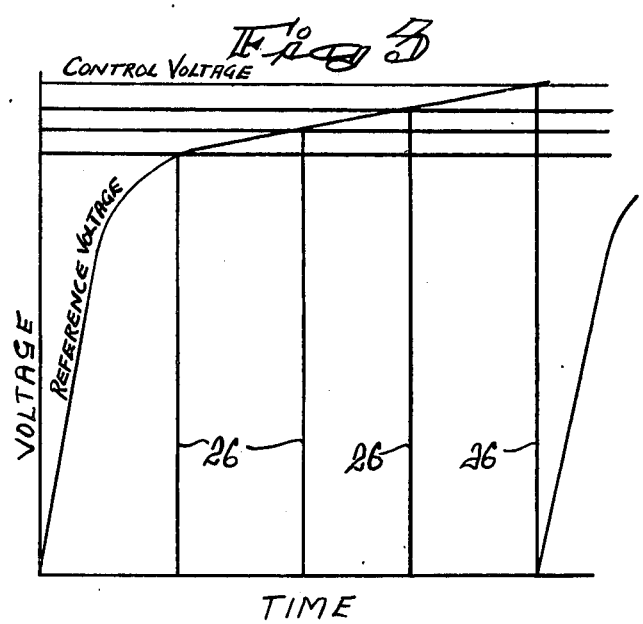
FIG. 3 is a graph of voltage versus time, indicating the voltages generated by the thermistors and by the timing means.

The reference voltage is in the form of a ramp voltage and the shape of its curve is shown in FIG. 3. Current is drawn from the power supply and resistance bridge 16 via the potentionmeter 17 to charge capacitor 18. Resistor 19 is connected in parallel with capacitor 18 as a shunt and effectively flattens the top of the voltage curve as shown in FIG. 3. Capacitor 18 is arranged to be discharged after a pre-selected interval determined by means of timing circuit 15. A stable voltage supply is provided by means of diode 20 and zener diode 21 and this supply passes current through potentiometer 22 to charge capacitor 23 until it fires diac 24 which in turn switches transistor 25 hard on to discharge capacitor 18.

It will be appreciated that the flatness of the voltage curve across capacitor 18 determines the sensitivity of the control of integrated circuit 5. While the control voltage across the thermistors (which are negative temperature coefficient thermistors) is higher than the ramp reference voltage pulses are fed to keep triac 10 on. As soon as the ramp voltage rises above the control voltage or alternatively the control voltage falls to a value below the ramp voltage the triac switches off and no power is fed to the heating elements 2. The flatness of the curve ensures a rapid increase in the 'off' time of the triac in relation to the total potential 'on' time. This aspect is indicated on FIG. 3 by means of the four vertical lines 26.

It will be further appreciated that with this apparatus the temperature of the blanket as well as the rate of rise of temperature of the blanket can be precisely controlled and selected by means of the 11 position selector switch 12 and preset potentiometers 17 and 22.

The control voltage from the top of the thermistors 13 is also fed to the input terminal 27 of integrated circuit 6. A fixed reference voltage is set on the terminals 28, 29 and 30 of the integrated circuit 6 by means of a preset potentiometer 31. While the control voltage is higher than this reference voltage pulses are fed to triac 32 to keep it fully on and also to keep relay 3 on. In this way power is fed to the heating elements via relay contacts 33 and interrupted from the alarm circuit 4 by relay contacts 34. If the thermistor leads should become either open or short circuited for any reason or if the control voltage falls below the reference voltage which is pre-set by potentiometer 31 the pulses the triac 32 cease thus preventing current from passing through relay coil 3 and causing relay contacts 33 to drop out. The supply voltage is thus disconnected from the heating elements 2.

An alarm circuit 4 is also provided including a visible alarm 35 and an audible alarm 36 adapted to operate only after a time delay. The time delay is included to ensure that the audible alarm does not switch on when the control circuit has been disturbed by external high frequency oscillations such as are produced in an operating theatre when a diathermy machine is used. To minimize the effect of these high frequency oscillations on the control circuit assembly choke coils 37 and 38 are included in the heating element and thermistors circuits respectively. However, this high frequency interference cannot be entirely eliminated. The delay circuit includes a rectifier and smoothing circuit comprising diode 39 and capacitor 40. This smoothed D.C. voltage is fed via relay contacts 41 and 42 through potentiometer 43 to charge capacitor 44. When the voltage across the capacitor 44 reaches the threshold voltage of uni-junction 45, the uni-junction 45 provides a pulse to the silicone controlled rectifier 46.

Figure 2:
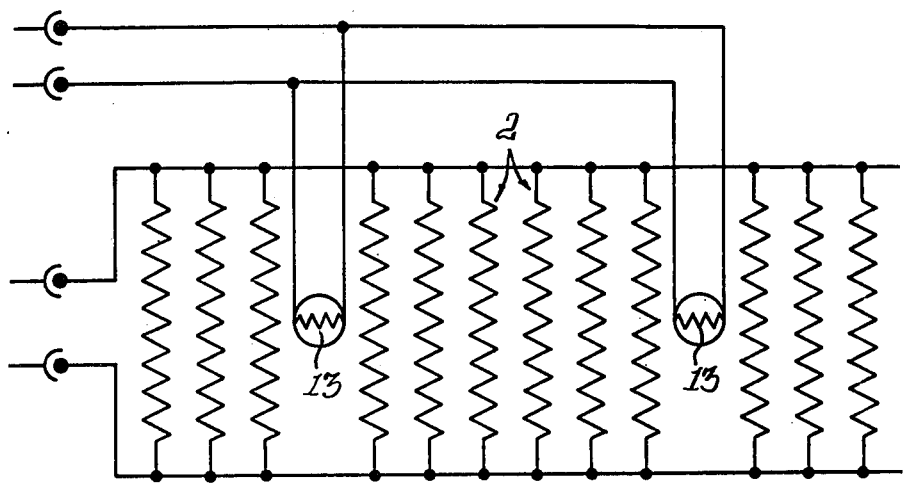
FIG. 2 is a circuit diagram of the electric blanket.

The silicone control rectifier fires, switching relay 47 on which switches the D.C. supply onto the loud speaker 48. Simultaneously the relay 47 removes the D.C. supply to the uni-junction transistor thus switching it off. The audible alarm stays active until such time as relay 47 is reactivated when the high frequency interference of the alarm condition has been removed. Further features of the invention are that the integrated circuits 5 and 6 are zero crossing sensing to minimise radio frequency interference generation and thus minimise the risk of disturbing other sensitive electrical equipment such as cardiac monitory equipment which may be in use in the vicinity of the blanket. The blanket itself includes twelve elements wired in parallel as well as two negative temperature coefficient thermistors as shown in FIG. 2. The blanket is sheathed in a completely sealed plastic envelope to waterproof it and the control circuit assembly and blanket itself are preferably also flame proof.

It will be appreciated that many variations in detail are possible to the blanket circuit itself and especially to the circuit of the control circuit assembly. In this way certain other features such as temperature holding means may be included. Also the invention has thusfar been described with reference to the particular circuitry shown in the diagrams but it will be appreciated that the essence of the invention lies in the temperature control and safety mechanisms in the event of over-temperatures and other malfunctions of the blanket. Thus different electronic components may be substituted for those shown and even the circuit configuration altered. These and the like variations are all envisaged as falling within the scope of this disclosure.

I claim:

1. An electric blanket assembly including a blanket having elements adapted to be heated from an electric supply source and a control circuit assembly adapted to control current through the elements to regulate the heating of the blanket and further adapted to disconnect the supply source from the heating elements under conditions of malfunction of the blanket, characterised in that the control circuit assembly includes temperature sensitive elements suitably located in the blanket and arranged to generate a control voltage, timing means adapted to generate a reference voltage and regulating means to compare the control voltage and the reference voltage and to trigger a solid state switching device which is adapted to control the current through the blanket heating elements.

2. The electric blanket assembly claimed in claim 1 wherein the regulating means includes differential amplifier circuitry, zero crossing detector amplifier circuitry and an output pluse circuit.

3. The electric blanket assembly claimed in claim 2 wherein the control voltage is applied to one input of the differential amplifier and the reference voltage is applied to the other input of the differential amplifier.

4. The electric blanket assembly claimed in claim 3 in which the output pluse circuit is connected to the solid state switching device and is adapted to trigger the latter.

5. The electric blanket assembly claim in claim 4 in which the solid state switching device is a triac.

6. The electric blanket assembly as claimed in claim 1 wherein the reference voltage is of a ramp like nature and is arranged to be cyclic with a preset time period.

7. The electric blanket assembly as claimed in claim 1 wherein the temperature sensitive elements are negative temperature coefficient thermistors.

8. The electric blanket assembly claimed in claim 1 wherein the control circuit assembly includes means to disconnect the supply source from the heating elements under conditions of malfunction of the blanket which is connected to the control voltage generated by the temperature sensitive elements and which is adapted to operate a relay to disconnect the supply from the heating elements, and further including differential amplifier circuitry, zero crossing detector amplifier circuitry and an output pulse circuit.

9. The electric blanket assembly claimed in claim 8 in which the output pulses from the output pulse circuit act to trigger a solid state switching device.

10. The electric blanket assembly claimed in claim 9 in which the solid state switching device is a triac.

11. The electric blanket assembly claimed in claim 1 in which the control circuit assembly includes a visible alarm.

12. The electric blanket assembly claimed in claim 11 in which the alarm is a visible alarm.

13. The electric blanket assembly claimed in claim 11 in which the alarm is visible and audible.

14. The electric blanket assembly claimed in claim 13 wherein the control circuit assembly includes delay circuitry to delay the triggering of the audible alarm.

* * * * *